United States Patent Office 2,957,810
Patented Oct. 25, 1960

2,957,810

NEOMYCIN FERMENTATION MEDIUM

Le Roy E. Johnson, Kalamazoo Township, Kalamazoo County, Harold J. Koepsell, Portage Township, Kalamazoo County, and Bruce W. Churchill, Comstock Township, Kalamazoo County, Mich., assignors to The Upjohn Company, Kalamazoo, Mich., a corporation of Michigan No Drawing. Filed Feb. 21, 1955, Ser. No. 489,728

10 Claims. (Cl. 195—80)

The present invention relates to neomycin and more particularly, to a new and novel nutrient fermentation medium for the production of neomycin in increased yields.

It is therefore an object of the invention to provide a new and novel nutrient fermentation medium for neomycin-producing microorganisms whereby enhanced yields of neomycin are obtained. A further object of the invention is to provide a process for the production of neomycin in enhanced yields. Other objects and features of the invention will be apparent to those skilled in the art to which the invention pertains.

Glucose (dextrose) has been used heretofore as a carbon source in the production of neomycin but relatively poor yields of neomycin were obtained apparently due to the fact that as the content of glucose is increased, accumulation of glycolytic materials such as organic acids, tend adversely to affect the neomycin production. It has also been proposed to use starch as a carbon source but according to Dulmage, Applied Microbiology, 1, 103–106 (1953), poor growth and low yields of neomycin were obtained.

It has now been found that unexpectedly high yields of neomycin are obtained by supplementing the glucose with starch and proportionately increasing the amount of proteinaceous material. Thus it has been found, according to the invention, that disproportionately high yields of neomycin are obtained when *Streptomyces fradiae* or a like neomycin-producing organism is cultured in an aqueous nutrient fermentation medium comprising at least about three percent of a proteinaceous material, figured on the protein content thereof, about one to about four percent of a readily assimilable carbohydrate, that is, one which is readily metabolized by the microorganism thereby resulting in rapid growth or multiplication of the microorganisms accompanied by the production of mycelium in large amounts, and at least about three percent of a slowly assimilable polysaccharide.

Suitable sources of proteinaceous materials include brewer's yeast, beef extract, soya peptone (including soya peptone prepared by acid or enzymatic hydrolysis of soybean protein), casein hydrolyzate (acid or enzymatic), distillers solubles, soybean meal (including expeller meal, extracted meal, finely ground meal, or whole soybean meal), egg peptone, soybean flour, and the like, soybean meal being especially preferred. Two or more of such proteinaceous materials are advantageously used.

The proteinaceous material should be present in the nutrient fermentation medium in an amount equal to not less than three percent by weight based on the protein content of the material added and preferably, between about 3.5 and about eight percent, although larger amounts can be satisfactorily included in the medium depending upon the limits of the system involved.

The above proteinaceous materials can be supplemented by other sources of nitrogen, for example, organic compounds such as urea, urea nitrate, ammonium carbamate, and the like, and inorganic compounds such as ammonium sulfate, ammonium carbonate, ammonium nitrate, ammonium phosphate, and the like.

Dextrins, including gum dextrin, and the like, starches such as potato starch, corn starch, manioc starch, rice starch, wheat starch, and the like, including various soluble starches, comprise members of the group of slowly assimilable polysaccharides, at least one of which must be present in the nutrient fermentation medium. This material must be present in the nutrient fermentation medium in an amount equal to at least about three percent by weight with about four to about five percent being preferred. Any larger amount which does not cause excessive thickening of the medium can be used but ordinarily, it will not be necessary or desirable to use more than about six percent starch. In the case of dextrin, concentrations in excess of six percent can be used without adversely affecting the viscosity of the medium.

Included within the class of readily assimilable carbohydrates are Cerelose (a commercial form of glucose or dextrose produced by Corn Products Refining Co., Argo, Illinois), fructose, and the like. This material should be present in the nutrient fermentation medium in an amount not less than about one percent and advantageously about two or 2.5 percent. Any larger amount which does not adversely affect the yield of neomycin can be used but ordinarily, it will not by necessary or advisable to use more than about three percent.

As indicated, to secure enhanced yields of neomycin, the nutrient fermentation medium should contain a combination of materials, i.e., proteinaceous material, readily assimilable carbohydrate and slowly assimilable polysaccharide, in stated amounts. This combination is unique and if any of the required constituents is not present, or if present, not in the indicated amounts, the yields of neomycin will be adversely affected thereby.

The production of neomycin is preferably conducted in a submerged culture of *S. fradiae* 3535 in an aqueous medium, under aerobic conditions. A suitable nutrient medium contains, in addition to the combination of required ingredients indicated above, a buffering agent, a salt such as sodium chloride and generally, a small supplemental amount of another proteinaceous material, for example, a small amount of brewer's yeast can be used advantageously to supplement soybean meal.

The pH, using a nutrient fermentation medium as described, may initially be weakly acidic, that is, at a pH of about six to about seven. As the fermentation progresses, the pH of the medium is lowered to between about 5.2 and 5.6. Since the yield of neomycin is adversely affected if the pH of the medium is allowed to remain at a pH below 5.5, it is desirable to add an agent such as calcium, sodium, or potassium carbonate, and the like, to maintain the pH at the proper level in the initial stages of the fermentation period. The quantity of this material is dependent upon the particular medium employed but should be in an amount sufficient to maintain the pH above about 5.2, the optimum amount varying between about 0.2 and about 1.0 percent by weight.

The fermentation is preferably conducted under aerobic conditions. Aeration is effected by any suitable means, with a rate preferably between about 1.0 and about three cubic feet of air per hour per gallon of culture medium.

To obtain highest yields of neomycin, the fermentation temperature is maintained between about 24 and about 37 degrees centigrade and preferably, between about 32 and about 35 degrees centigrade.

The inoculum used for seeding cultures of *Streptomyces fradiae* 3535 for the production of neomycin may be obtained from agar slants, but since the best yields are obtained when the quantity of inoculum used is between about one and about five percent by volume of the total volume of the medium, a greater quantity of the inoculum is necessary than can be obtained easily from agar slants. To prepare the desired quantity of seed culture, "shake-flasks" containing a suitable nutrient medium for the growth of *Streptomyces fradiae* 3535, but which medium does not necessarily produce neomycin, are inoculated with cultures maintained on agar slants. The organism in this liquid medium is then used to inoculate larger containers for the growth of seed culture which in turn is used to inoculate the larger tanks used in commercial production.

The fermentation is allowed to continue for periods of time varying between about sixty and about 144 hours, a 72 to 120 hour period being preferred.

Neomycin is assayed according to a modification of the method of Loo et al., J. Bact. 50, 701 (1945), wherein the bottom layer of nutrient agar is omitted and the nutrient agar containing *B. subtilis* is poured directly into a Petri dish. A paper disc is placed upon the cooled nutrient agar on which is poured the dilution of the neomycin preparation to be tested and the zone of inhibition or growth is determined after eighteen hours. This method of assay gives the quantity of neomycin by reference to a neomycin sulfate standard (one microgram of neomycin sulfate=0.2 Waksman units or 0.7 microgram of neomycin base). Throughout the specification, the quantity of neomycin is given in micrograms of neomycin sulfate per milliliter.

The following procedures, tables, illustrative examples and general information are illustrative only and the invention is not to be construed as limited in spirit or in scope by the details set forth. Unless otherwise indicated, parts are by weight and percentages are weight by volume.

EXAMPLE 1

To each series of six 500-milliliter Erlenmeyer flasks was added 100 milliliters of the following medium:

| | Grams |
|---|---|
| Cerelose (glucose monohydrate) | 10 |
| Peptone, Difco | 5 |
| Beef extract, Difco | 10 |
| Sodium chloride | 5 |
| Tap water to 1 liter. | |

The flasks were sterilized by autoclaving for a period of thirty minutes at 250 degrees centigrade. They were then inoculated with an aqueous spore suspension of *Streptomyces fradiae*, Waksman's strain 3535X, grown on the following medium:

| | Grams |
|---|---|
| Cerelose (glucose monohydrate) | 10 |
| Brewer's yeast | 10 |
| Curbay B.G. | 5 |
| Potassium chloride | 4 |
| Calcium carbonate | 1 |
| Agar | 15 |
| Tap water to 1 liter. | | and incubated on a reciprocating shaker at 28 degrees centigrade for three days. The shaker operated at 90 four-inch strokes per minute.

600 milliliters of the pre-seed medium thus obtained was used to inoculate 300 liters of the following sterile (sterilized by heating at 250 degrees Fahrenheit for thirty minutes) seed medium:

| | Grams |
|---|---|
| Cerelose (glucose monohydrate) | 25 |
| Soy flour | 25 |
| Brewer's yeast | 2.5 |
| Ammonium sulfate | 5 |
| Calcium carbonate | 8 |
| Sodium chloride | 4 |
| Potassium dihydrogen phosphate | 0.4 |
| Tap water to 1 liter. | |

The fermentation was conducted in a resin-coated iron tank maintained at 32 degrees centigrade. Agitation was supplied by a draft-tube impeller operating at 200 r.p.m. Sterile air was supplied at a rate of 9.7 standard cubic feet per minute. To control foaming, 300 milliliters of CLRS defoamer (a commercial mixture containing free fatty acid and glycerides) was added initially and an additional 2100 milliliters was added during the course of the fermentation. The fermentation was continued for a period of 45 hours.

Twelve liters of the seed thus obtained was used to inoculate each of a series of 100 gallon stainless steel fermentors containing 250 liters of sterile media of the composition given in Table I and the tables below. The inoculated tanks were maintained at 32 degrees centigrade, sparged with sterile air at 100 standard cubic feet per hour, and agitated with draft-tube impellers at 280 r.p.m. Samples were taken at the indicated hours. To control foaming, 300 milliliters of lard oil was included in the initial medium and a solution of one percent of octadecanol in lard oil was added in the amounts indicated. The fermentation was continued for 114 hours.

Table I

EFFECT OF STARCH LEVEL IN HIGH SOY MEDIA

| Tank | A | B | C | D | E |
|---|---|---|---|---|---|
| Medium, gms./liter: | | | | | |
| Cerelose | 20 | 20 | 20 | 20 | 20 |
| Starch | 0 | 10 | 20 | 30 | 40 |
| Soybean meal | 50 | 50 | 50 | ¹ 50 | 50 |
| Pabst yeast | 5 | 5 | 5 | 5 | 5 |
| Sodium chloride | 5 | 5 | 5 | 5 | 5 |
| Calcium carbonate | 2 | 2 | 2 | 2 | 2 |
| Defoamer used,² mls | 800 | 2,350 | 600 | 2,000 | 600 |
| pH: | | | | | |
| 0 hours | 6.30 | 6.25 | 6.30 | 6.30 | 6.30 |
| 18 hours | 5.42 | 5.40 | 5.68 | 6.05 | 5.70 |
| 42 hours | 7.50 | 7.10 | 6.90 | 7.10 | 6.75 |
| 66 hours | 8.15 | 7.70 | 7.50 | 7.10 | 6.90 |
| 90 hours | 8.40 | 7.80 | 8.00 | 7.60 | 7.25 |
| 114 hours | 8.70 | 7.95 | 8.20 | 7.90 | 7.75 |
| Neomycin Sulfate, mcgs./ml.: | | | | | |
| 42 hours | 1,913 | 2,200 | 2,638 | 2,150 | 1,988 |
| 66 hours | 2,500 | 2,875 | 4,275 | 4,850 | 3,700 |
| 90 hours | 2,700 | 3,375 | 4,575 | 5,000 | 5,725 |
| 114 hours | 2,500 | 4,000 | 4,850 | 6,250 | 7,450 |

¹ Kay Soy.
² In addition, 300 milliliters of lard oil was included in the initial medium in each tank to control foaming during sterilization.

The results indicate that with high soybean levels, in combination with twenty grams of Cerelose and a significant amount of starch (twenty grams), a high yield of neomycin is obtained. When the amount of starch is increased to forty grams, a significantly higher yield of neomycin is obtained. When starch is not included in the medium or when included, in an insufficient amount (ten grams), low yields of neomycin are obtained.

The replacement of soybean meal by Kay Soy (extracted soybean meal ground to a flour which will pass through a 100 screen mesh) compares favorably with the yields obtained by the use of soybean meal in combination with Cerelose and starch.

EXAMPLE 2

Twelve liters of seed (obtained as in Example 1) was used to inoculate each of a series of five stainless steel fermentors (fully baffled) containing 250 liters of sterile medium (sterilized by heating at 250 degrees Fahrenheit for thirty minutes) of the compositions given in Table II. The inoculated tanks were held at 32 degrees centigrade, sparged with sterile air at 100 standard cubic feet per hour and agitated with flat four-bladed turbines (each blade is two inches wide and 3.5 inches long, set radially to the shaft at a ninety degree pitch) at 280 r.p.m. Foaming was controlled as in Example 1.

Table II

EFFECT OF CERELOSE LEVEL IN HIGH SOY MEDIA—NO STARCH

| Tank | F | G | H | I | J |
|---|---|---|---|---|---|
| Medium, gms./liter: | | | | | |
| Cerelose | 20 | 30 | 40 | 60 | 100 |
| Soybean meal | 50 | 50 | 50 | 50 | 50 |
| Pabst yeast | 5 | 5 | 5 | 5 | 5 |
| Sodium chloride | 5 | 5 | 5 | 5 | 5 |
| Calcium carbonate | 2 | 2 | 2 | 2 | 2 |
| Defoamer used,[1] mls | 3,300 | 3,500 | 2,300 | 2,600 | 5,100 |
| pH: | | | | | |
| 0 hours | 6.30 | 6.20 | 6.17 | 6.08 | 6.05 |
| 18 hours | 6.16 | 5.20 | 5.25 | 5.20 | 5.40 |
| 42 hours | 7.52 | 7.20 | 6.80 | 5.10 | 5.08 |
| 66 hours | 8.01 | 7.68 | 7.44 | 6.05 | 5.20 |
| 90 hours | 7.90 | 7.98 | 7.90 | 7.18 | 5.35 |
| 114 hours | 8.03 | 7.73 | 7.86 | 7.61 | 5.91 |
| Neomycin Sulfate, mcgs./ml.: | | | | | |
| 42 hours | 2,563 | 1,725 | 787 | <200 | <200 |
| 66 hours | 3,250 | 3,175 | 2,625 | 135 | <100 |
| 90 hours | 3,200 | 3,225 | 3,500 | 1,040 | <50 |
| 114 hours | 3,275 | 3,825 | 3,800 | 2,060 | [2]<5 |

[1] Additional lard oil was used in initial medium as in Example 1.
[2] Tank J was uncontaminated (by microscopic examination) up to 90 hours, but showed contamination at 116 hours.

These data show that Cerelose begins to have a deleterious effect at about thirty grams/liter and that above forty grams/liter, the effect is very pronounced. In view of the low pH at eighteen hours and the low yield during the first 42 hours obtained with thirty and forty grams/liter of Cerelose, the Cerelose concentration most advantageously, should not exceed about thirty grams/liter.

The following table illustrates the effect on the yields of neomycin when the level of soybean meal in the medium is increased from 25 to fifty grams per liter, the Cerelose and starch levels remaining constant. The fermentation was conducted in draft tube fermentors maintained at 32 degrees centigrade and aerated at a rate of 100 standard cubic feet per hour.

Table III

EFFECT OF SOYBEAN MEAL LEVELS—CERELOSE AND STARCH LEVELS CONSTANT

| Tank | K | L | M | N | O | Av. 18 runs |
|---|---|---|---|---|---|---|
| Medium, gms./liter: | | | | | | |
| Cerelose | 20 | 20 | 20 | 20 | 20 | 20 |
| Starch | 40 | 40 | 40 | 40 | 40 | 40 |
| Soybean meal | 25 | 30 | 35 | 50 | 50 | 50 |
| Pabst yeast | 5 | 5 | 5 | 5 | 5 | 5 |
| Sodium chloride | 5 | 5 | 5 | 5 | 5 | 5 |
| Calcium carbonate | 2 | 2 | 2 | 2 | 2 | 2 |
| Defoamer used, mls | 800 | 700 | 700 | 800 | 900 | |
| pH: | | | | | | |
| 18 hours | 6.12 | 6.24 | 6.00 | 5.75 | 5.40 | |
| 42 hours | 7.20 | 7.08 | 6.90 | 6.80 | 6.50 | |
| 66 hours | 7.40 | 7.25 | 7.20 | 6.85 | 6.80 | |
| 90 hours | 7.30 | 7.30 | 7.30 | 7.30 | 7.45 | |
| 114 hours | 7.40 | 7.60 | 7.60 | 7.90 | 7.45 | |
| Neomycin Sulfate, mcgs./ml.: | | | | | | |
| 42 hours | 1,725 | 1,738 | 1,663 | 1,250 | 2,000 | |
| 66 hours | 2,250 | 2,550 | 2,950 | 3,275 | 3,900 | |
| 90 hours | 3,625 | 4,400 | 4,475 | 5,050 | 5,050 | |
| 114 hours | 3,975 | 5,075 | 4,875 | 5,150 | 8,775 | 6,500 |

The results indicates that excellent yields are obtained when fifty grams per liter of soybean meal are present in media containing twenty grams of Cerelose and forty grams of starch.

The following table indicates the effect on neomycin yields of a medium containing in addition to a high soybean meal concentration and Cerelose, a slowly assimilable sugar such as dextrin. The fermentations were conducted in turbine blade fermentors maintained at a temperature of 32 degrees centigrade and aerated at a rate of 100 standard cubic feet per hour.

Table IV

ADDITION OF DEXTRIN TO A HIGH SOYBEAN MEAL-CERELOSE MEDIUM

| Tank | P | Q | R | S |
|---|---|---|---|---|
| Medium; gms./liter: | | | | |
| Cerelose | 20 | 20 | 20 | 20 |
| Dextrin | 0 | 10 | 20 | 40 |
| Soybean meal | 50 | 50 | 50 | 50 |
| Pabst yeast | 5 | 5 | 5 | 5 |
| Sodium chloride | 5 | 5 | 5 | 5 |
| Calcium carbonate | 2 | 2 | 2 | 2 |
| Defoamer used mls | 800 | 2,350 | 600 | 600 |
| pH: | | | | |
| 18 hours | 5.42 | 5.40 | 5.68 | 5.70 |
| 42 hours | 7.50 | 7.10 | 6.90 | 6.75 |
| 66 hours | 8.15 | 7.70 | 7.50 | 6.90 |
| 90 hours | 8.40 | 7.80 | 8.00 | 7.25 |
| 114 hours | 8.70 | 7.95 | 8.20 | 7.75 |
| Neomycin Sulfate mcgs./ml.: | | | | |
| 42 hours | 1,913 | 2,200 | 2,638 | 1,988 |
| 66 hours | 2,500 | 2,875 | 4,275 | 3,700 |
| 90 hours | 2,700 | 3,375 | 4,575 | 5,725 |
| 114 hours | 2,500 | 4,000 | 4,850 | 7,450 |

The results indicate that the addition of dextrin, in increasing amounts, to a medium containing fifty grams of soybean meal and a sufficient amount of Cerelose, i.e., twenty grams, brings about a proportional increase in the neomycin yields obtained.

It is to be understood that the invention is not to be limited to the exact details of operation as shown and described herein, as obvious modifications and equivalents will be apparent to one skilled in the art. The invention is therefore to be limited only by the scope of the appended claims.

We claim:

1. A nutrient fermentation medium for the production of neomycin in enhanced yield comprising, as essential ingredients, between about 3 and about 8 percent soybean meal, between about one and about 4 percent of a readily assimilable carbohydrate and at least about three percent of a slowly assimilable polysaccharide.

2. A nutrient fermentation medium for the production of neomycin in enhanced yield comprising, as essential ingredients, between about 3 and about 8 percent soybean meal, between about one and about four percent glucose and at least about three percent dextrin.

3. A nutrient fermentation medium for the production of neomycin in enhanced yield comprising, as essential ingredients, between about 3 and about 8 percent soybean meal, between about one and about four percent glucose and at least about three percent starch.

4. A nutrient fermentation medium for the production of neomycin in enhanced yield comprising, as essential ingredients, about five percent soybean meal, between about two and about 2.5 percent glucose and between about four and about five percent starch.

5. A nutrient fermentation medium for the production of neomycin in enhanced yield comprising, as essential ingredients, about five percent soybean meal, between about two and about 2.5 percent glucose and between about four and about five percent dextrin.

6. A process for the production of neomycin in enhanced yield which comprises cultivating a neomycin-producing microorganism in a nutrient fermentation medium comprising essentially, between about 3 and about 8 percent soybean meal, between about one and about four percent of a readily assimilable carbohydrate and at least about three percent of a slowly assimilable polysaccharide.

7. A process for the production of neomycin in enhanced yield which comprises cultivating a neomycin-producing microorganism in a nutrient fermentation medium comprising essentially, between about 3 and about 8 percent soybean meal, between about one and about four percent glucose and at least about three percent dextrin.

8. A process for the production of neomycin in enhanced yield which comprises cultivating a neomycin-producing microorganism in a nutrient fermentation medium comprising essentially, between about 3 and about 8 percent soybean meal, between about one and about four percent glucose and at least about three percent starch.

9. A process for the production of neomycin in enhanced yield which comprises cultivating a neomycin-producing microorganism in a nutrient fermentation medium comprising essentially, about five percent soybean meal, between about two and about 2.5 percent glucose and between about four and about five percent starch.

10. A process for the production of neomycin in enhanced yield which comprises cultivating a neomycin-producing microorganism in a nutrient fermentation medium comprising essentially, about five percent soybean meal, between about two and about 2.5 percent glucose and between about four and about five percent dextrin.

References Cited in the file of this patent

UNITED STATES PATENTS

| | | |
|---|---|---|
| 2,461,922 | Rake | Feb. 15, 1949 |
| 2,515,461 | McDaniel | July 18, 1950 |
| 2,516,682 | Donovick | July 25, 1950 |
| 2,799,620 | Waksman | July 16, 1957 |

FOREIGN PATENTS

| | | |
|---|---|---|
| 1,013,753 | France | May 7, 1952 |

OTHER REFERENCES

Dulaney: Jour. Bact., 56, September 3, 1948, pp. 305–312.

Waksman et al.: Science, 109, No. 2830, pp. 305–7, March 25, 1949.

Waksman et al.: Neomycin-Production and Antibiotic Properties, Second National Symposium on Recent Advances in Antibiotic Research held in Washington, D.C., April 11–12, 1949, under the auspices of the Antibiotics Study Section of the National Institutes of Health, Public Health Service, Federal Security Agency.

Swart et al.: Arch. Biochem. 24, November 1, 1949, p. 93.

Waksman: The Actionmycetes, 1950, Chronica Botanica Co., Waltham, Mass., pp. 194–196.

Leach et al.: Jour. Am. Chem. Soc. 73 (1951), pp. 2799.

Waksman: Neomycin, Rutgers University Press, New Brunswick, N.J., 1953, pp. 46, 47, 53 to 62.

Dulmage: Applied Microbiology, 1 (1953), pp. 103–106.